United States Patent [19]

Messinger

[11] Patent Number: 4,613,931

[45] Date of Patent: Sep. 23, 1986

[54] PORTABLE FIBEROPTIC LIGHT SOURCE FOR USE IN HAZARDOUS LOCATIONS

[75] Inventor: Elmar K. Messinger, New York, N.Y.

[73] Assignee: 501 Olympus Corporation, Lake Success, N.Y.

[21] Appl. No.: 613,800

[22] Filed: May 24, 1984

[51] Int. Cl.$^4$ .......................... F21V 29/00; F21V 7/04
[52] U.S. Cl. ........................... 362/373; 362/32; 362/218; 362/294; 362/158
[58] Field of Search ................. 362/32, 218, 294, 373, 362/804, 376, 377, 378, 158

[56] References Cited

U.S. PATENT DOCUMENTS

| | | | |
|---|---|---|---|
| 1,965,865 | 7/1934 | Thompson | 128/23 |
| 2,295,339 | 9/1942 | Ericson | 362/376 |
| 2,939,945 | 6/1960 | Ryen | 362/32 |
| 3,265,885 | 8/1966 | Porter | 362/218 |
| 3,382,353 | 5/1968 | Wappler | 362/32 |
| 3,461,282 | 8/1969 | Martinez | 362/32 |
| 3,638,013 | 1/1972 | Keller | 362/32 |
| 3,681,592 | 8/1972 | Hugelshofer | 362/32 |
| 3,710,091 | 1/1973 | Holcomb | 362/32 |
| 3,733,481 | 5/1973 | Kuyt | 362/32 |
| 3,758,951 | 9/1973 | Scrivo et al. | 32/27 |
| 3,770,338 | 11/1973 | Helmuth | 350/96 R |
| 3,775,606 | 11/1973 | Bazell et al. | 362/32 |
| 4,042,819 | 8/1977 | Dacal | 362/376 |
| 4,069,415 | 1/1978 | Dacal | 362/263 |
| 4,241,382 | 12/1980 | Daniel | 362/32 |
| 4,363,080 | 12/1982 | Sylvester | 362/32 |
| 4,414,608 | 11/1983 | Furihata | 362/32 |
| 4,419,716 | 12/1983 | Koo | 362/218 |

OTHER PUBLICATIONS

Factory Mutual Research Approval Standard Explosionproof Electrical Equipment booklet, Class No. 3615, Jan. 1, 1979.
National Electrical Code Handbook by the National Fire Protection Association, 3/1984, Article 501-1, pp. 638-639, Quincy, Massachusetts.
Electrical Equipment for Hazardous Locations by Underwriters Laboratories Inc., form 2000-304-3M780, p. 3.
Advertisement—"Lenox Explosion-Proof Borescope Light Source", Lenox Instrument Co., copyright 3/1983.

Primary Examiner—Ira S. Lazarus
Attorney, Agent, or Firm—Kenyon & Kenyon

[57] ABSTRACT

A portable fiberoptic light source for use in hazardous environments includes such safety features as an aluminum housing with flame paths and cooling fins, explosion proof input connector, cable and cable plug, a shock-mounted lamp housing, a tempered heat absorbing filter, a pyrex shield and a heat shield.

11 Claims, 5 Drawing Figures

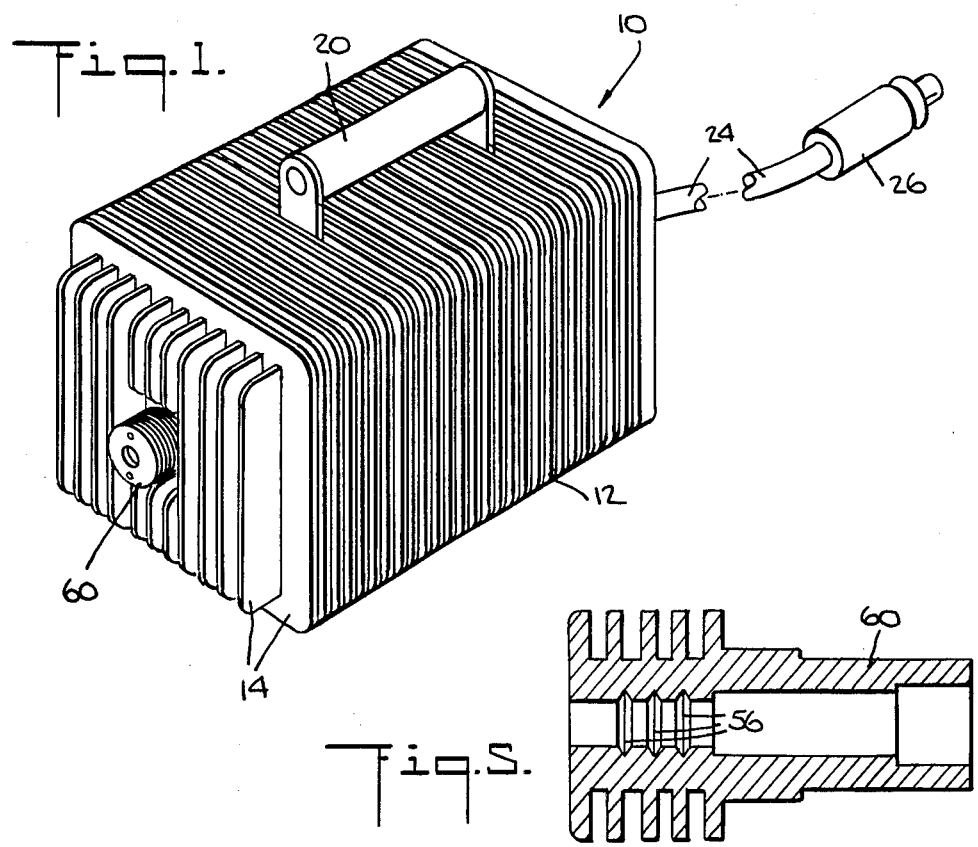
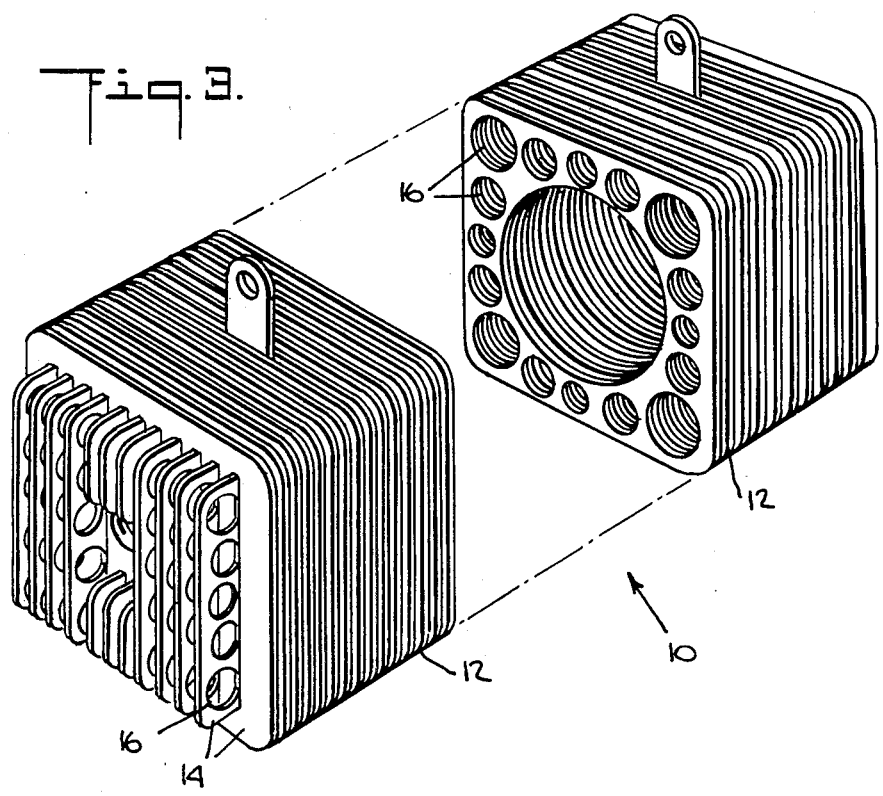

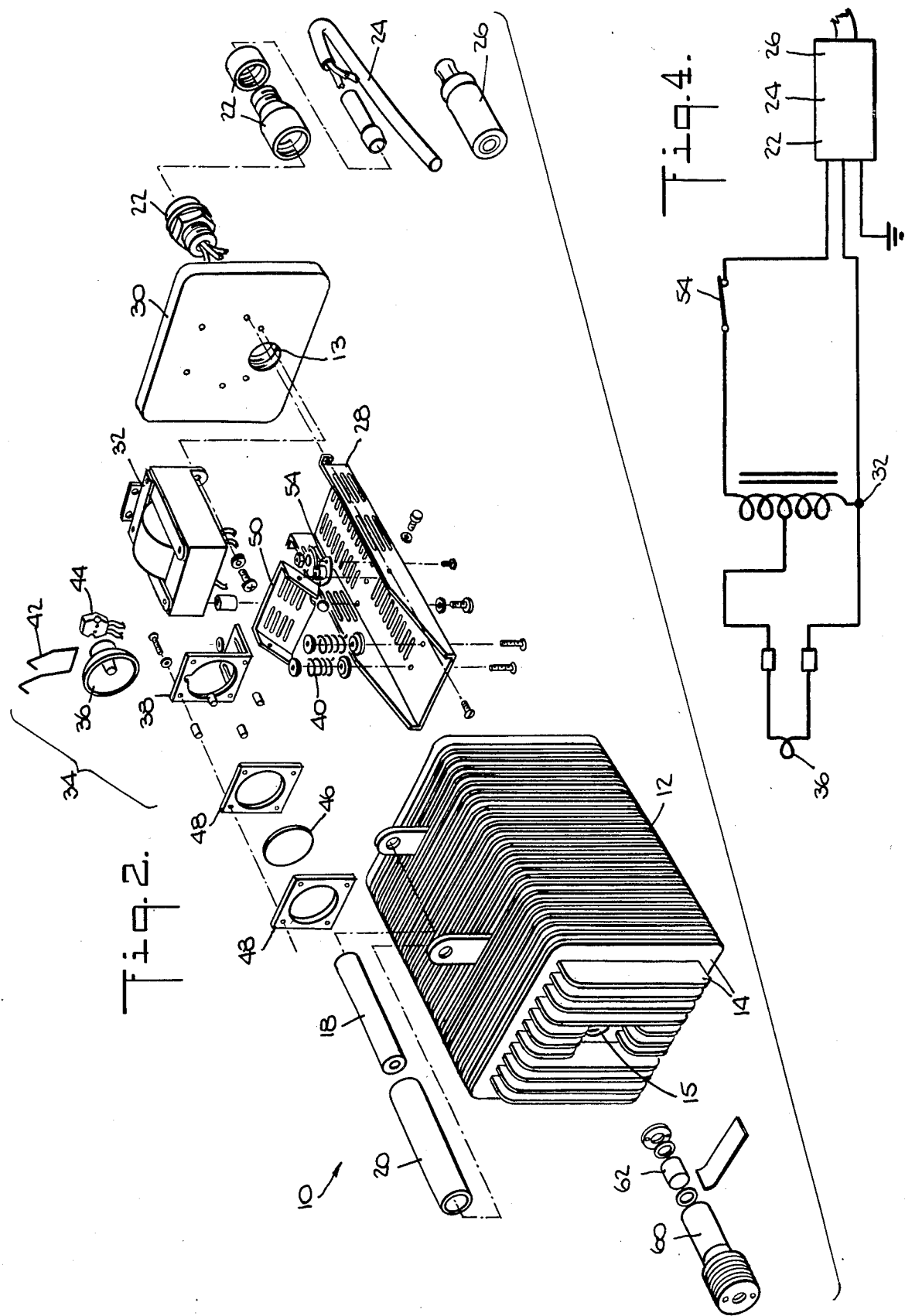

PORTABLE FIBEROPTIC LIGHT SOURCE FOR USE IN HAZARDOUS LOCATIONS

BACKGROUND OF THE INVENTION

1. Field of the Invention

This invention relates to light sources in general and more particularly to a light source for a borescope/fiberscope visual system which is portable and specifically designed for safe use in hazardous locations.

2. Description of the Prior Art

Borescopes, fiberscopes and fiberoptic light guides connected to an electrical source are used to visually inspect the internal condition of a wide variety of objects where disassembly is costly, where disassembly is not possible and in medical applications. These instruments are in use today and are well known in the field.

The use of these instruments has been limited or prohibited, however, where there is a real risk of fire or explosion from the heat of the projection lamps, sparking or a failure of the electric circuit. Hazardous environments which provide a high risk of fire or explosion with the use of a light source may be found in nearly any industry. Some examples of such hazardous environments include those found on off shore oil rigs, on board ships, in the space program, in the munitions industry, during military and commercial aircraft maintenance, and in relation to electrical utility companies for industrial turbines, mines, food processing plants such as flour mills, plastics, oil refineries and the chemical industry. In addition, hazardous environments exist in health care facilities.

The need for a fiberoptic light source for use in hazardous conditions has been previously recognized in the field. Previous attempts, however, to provide a safe and effective light source for continuous use in hazardous locations have been unsuccessful.

For example, some prior art devices have attempted to avoid the use of an external electrical power source in order to ensure safety. These devices, however, have lacked sufficient power to provide adequate illumination.

Other prior art devices have provided cutoff switches that cause the device to stop operating when it becomes overheated. Such devices, however, fail to provide continuous illumination for an adequate period of time.

Certain prior art devices, such as the energizer disclosed in U.S. Pat. No. 3,681,592 do contain a number of safety features. These devices, however, do not provide all the available safety features necessary to ensure continuous, safe operation in a hazardous location.

Finally, to the degree these prior art devices may be considered safe for use in hazardous environments, none of these devices are both portable and able to provide continuous illumination.

SUMMARY OF THE INVENTION

It is therefore an object of the present invention to overcome the aforementioned disadvantages of prior art devices and provide a portable fiberoptic light source designed for continuous operation in hazardous locations.

It is a further object of the present invention to provide a portable fiberoptic light source designed for continuous operation in hazardous locations which is capable of providing varying degrees of illumination.

These and other objects of the present invention are achieved in a portable fiberoptic light source comprised of a heavy aluminum housing with flame paths at a maximum for its construction and cooling fins disposed on the exterior of the housing. A handle is located on the housing and an explosion-proof input connector, cable and cable plug provide power to the light source. The interior of the housing contains a chassis on which are disposed a transformer, a shock-mounted lamp housing and a thermal limit switch. The light source also contains a lamp, a tempered heat absorbing filter, a pyrex shield and a heat shield.

These and other novel features and advantages of the invention will be described in greater detail in the following detailed description.

BRIEF DESCRIPTION OF THE DRAWINGS

In the drawings, wherein similar reference numerals denote similar elements throughout the several views thereof:

FIG. 1 is a perspective view of a fiberoptic light source constructed according to the present invention;

FIG. 2 is an exploded view of the fiberoptic light source showing the relationship of its internal features;

FIG. 3 is a view of the fiberoptic light source showing the cooling fins with apertures for increased cooling;

FIG. 4 is a schematic diagram of the present invention; and

FIG. 5 is a view of the light guide socket of the fiberoptic light source with internal indents for varying the illumination of the light source.

DETAILED DESCRIPTION

Referring now to the drawings, and in particular to FIGS. 1 and 2, there is shown a portable fiberoptic light source, generally identified by reference numeral 10, which is optimally designed to provide continuous operation in hazardous locations.

The light source 10 is comprised of a heavy aluminum housing 12. The housing 12 is formed with external cooling fins 14 for maximum dissipation of heat. The housing 12 is also provided with flame paths at a maximum for its size and an input aperture 13 and output aperture 15. The flame paths in the light source 10 are located at the threaded assembly of the light guide socket 60 and output aperture 15; at the joint between the housing 12 and the rear plate 30; at the threaded assembly of the electrical input connector 22 and the rear plate 30; and at the lens mounting in the light guide socket 60.

As illustrated in FIG. 3, in an alternative embodiment of the present invention the cooling fins 14 contain a plurality of apertures 16. The apertures 16 improve air flow and facilitate heat dissipation from the housing 10. In addition, the apertures 16 reduce the total weight of the light source 10 thereby adding to the portable nature of the device.

Returning to FIGS. 1 and 2, the light source 10 further comprises a handle 18. In the preferred embodiment of the present invention, the handle 18 has disposed about it a phenolic exterior grip 20. The handle 18 facilitates the movement of the present invention which weighs approximately twenty and one-half pounds. This weight is substantially less than other light sources designed for use in hazardous locations. Additionally, the use of the phenolic grip 20 permits a user to move the light source of the present invention without contacting the housing 12 which may be of an increased temperature.

The light source 10 is also comprised of an electrical input connector 22, cable 24 and cable plug 26 all of which are of suitable explosion-proof construction. The explosion-proof construction of these elements is carried out in conventional fashion.

As illustrated in FIG. 2, the light source 10 is further comprised of a chassis 28 which is removably insertable into the housing 12. In order to remove the chassis 28 a rear plate 30 forms one side of the housing 12. The rear plate 30 may be detached from the housing 12. The rear plate 30 and chassis 28 are removable as one assembly.

Positioned on the chassis 28 is a transformer 32 and a shock-mounted housing 34 for the lamp 36. The shock-mounted housing 34 is an additional safety feature which is comprised of a lamp mount 38 which is cushioned from the chassis 28 by one or more springs 40.

The lamp 36 is held in place by a lamp clip 42. The lamp clip 42 and a connector 44 are designed so as to permit removal and replacement of the lamp 36 by the user of the present device. In the preferred embodiment of the present invention the lamp 36 has a voltage of 12 VAC and a wattage of 100 watts.

The light source 10 also includes additional safety features such as a tempered heat absorbing filter 46 mounted in front of the lamp 36 and held in position by filter mounts 48. A pyrex shield 62 is incorporated into the light guide socket 60, said socket 60 being threadably insertable into the housing 12 at the output aperture 15. Both the filter 46 and the shield 62 facilitate the dissipation of heat from the light source 10. Another safety feature of the light source 10 is a heat shield 50 positioned on the lamp mount 38. The heat shield 50 separates the high voltage connectors from the lamp compartment.

An additional safety feature of the present device is a high temperature cutoff switch which is comprised of a thermal limit switch 54 positioned on the chassis 28. Cutoff switches in prior art devices have played an integral part in their safe operation. Temperatures normally rise to the cutoff level in these devices, thereby necessitating a cease in operation. The thermal switch 54 of the present device, however, is provided solely for protection in the case of an unforeseen malfunction. The various other safety features of the light source 10 permit continuous operation of the present device at a temperature below that needed to activate switch 54. In addition, if activated, switch 54 will automatically reset after the light source 10 has cooled down to a predetermined safe level.

FIG. 4 represents a schematic diagram of the present invention. As shown in this drawing, the lamp 36 is coupled to the output of the transformer 32 and the input of the transformer 32 is coupled to the thermal limit switch 54. The switch 54 is also coupled to the electrical input connector 22 which in turn is coupled to the cable 24. Finally, the cable 24 is coupled to the cable plug 26 which in turn is coupled to an electrical source.

As illustrated in FIG. 5, an alternative embodiment of the present invention provides for the control of light intensity. Certain prior art devices have provided for variable light intensity by means of the use of a rheostat control. This method introduces the build up of heat and the potential electrical failure associated with rheostat controls. In addition, the control of brightness by rheostat results in a change in the color of the light which inhibits the use of a fiberscope in certain instances. The disadvantage of such control has been previously recognized as is illustrated by U.S. Pat. No. 3,775,606.

The present device permits variable illumination by means of indented stops 56 located within the light guide socket 60. When a light guide plug is inserted into the light guide socket 60, the spring on the plug will engage in one of the indented stops 56. The position of the indented stops 56 are calibrated to position the light guide tip at the focus point of the lamp or at specific distances away from the focus point. In the preferred embodiment of the present invention the indented stops 56 are calibrated to produce 100%, 90%, 80% or 70% of maximum brightness.

The combination of the previously described safety features has resulted in approval of the present invention by Factory Mutual and Underwriters Laboratories Listings and provides the present device with the capability of being used in hazardous environments while still being portable in nature.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A light source for use in hazardous environments, comprising:
    a housing, having a longitudinal axis, including:
        an input aperture; and,
        a front surface having an output aperture therein;
    a first plurality of cooling fins, disposed vertically, spaced apart, along said longitudinal axis of said housing, and having a first aperture therethrough disposed along said longitudinal axis of said housing;
    a second plurality of cooling fins projecting from said front surface of said housing into an ambient atmosphere;
    means, disposed within said first aperture, for illuminating said output aperture; and,
    at least one flame path having a maximum length for a size of said housing.

2. An apparatus as in claim 1 further comprising means, disposed within said housing between said illuminating means and said output aperture, for absorbing heat generated by said illuminating means.

3. An apparatus as in claim 2 further comprising:
    an electrical input connector of explosion-proof construction, threadably insertable in said input aperture of said housing;
    a cable of explosion proof construction, coupled to said electrical input connector; and,
    a cable plug of explosion proof construction, coupled to said cable.

4. An apparatus as in claim 3 further comprising:
    a light guide socket having an input and an output end, said input end threadably insertable in said output aperture; and,
    a pyrex shield disposed within said light guide socket.

5. An apparatus as in claim 4 wherein said light guide socket comprises at least two indented stops disposed in said output end of said light guide socket.

6. An apparatus as in claim 1 wherein said second plurality of cooling fins are disposed vertically and spaced apart.

7. An apparatus as in claim 6 further comprising means, disposed within said housing between said illuminating means and said output aperture, for absorbing heat generated by said illuminating means.

8. An apparatus as in claim 1 wherein a first plurality of apertures is disposed through said first plurality of cooling fins.

9. An apparatus as in claim 8 wherein said second plurality of cooling fins are disposed vertically and spaced apart.

10. An apparatus as in claim 9 wherein a second plurality of apertures is disposed through said second plurality of cooling fins.

11. An apparatus as in claim 10 further comprising means, disposed within said housing between said illuminating means and said output aperture, for absorbing heat generated by said illuminating means.

* * * * *

UNITED STATES PATENT AND TRADEMARK OFFICE
CERTIFICATE OF CORRECTION

PATENT NO. : 4,613,931

DATED : September 23, 1986

INVENTOR(S) : Elmar K. Messinger

It is certified that error appears in the above-identified patent and that said Letters Patent is hereby corrected as shown below:

Abstract, line 4, between "sion" and "proof", insert a hyphen.

Column 1, line 21, after "ing" insert a comma.

Column 1, line 25, between "off" and "shore", insert a hyphen.

Column 2, line 52, after "invention" insert a comma.

Column 3, line 10, after "chassis 28", insert a comma.

Column 3, line 43, change "cease in" to --cessation of--.

UNITED STATES PATENT AND TRADEMARK OFFICE
CERTIFICATE OF CORRECTION

PATENT NO. : 4,613,931

DATED : September 23, 1986

INVENTOR(S) : Elmar K. Messinger

It is certified that error appears in the above-identified patent and that said Letters Patent is hereby corrected as shown below:

Column 3, line 64, between "build" and "up", insert a hyphen.

Column 4, line 2, omit the word "is" between "as" and "illustrated".

Signed and Sealed this

Third Day of March, 1987

*Attest:*

DONALD J. QUIGG

*Attesting Officer*  *Commissioner of Patents and Trademarks*